(12) United States Patent
Hasegawa et al.

(10) Patent No.: US 7,369,728 B1
(45) Date of Patent: May 6, 2008

(54) FERRULE FOR OPTICAL WAVE GUIDE

(75) Inventors: Masaki Hasegawa, Kanagawa-ken (JP);
Fumiaki Yamada, Kanagawa-ken (JP);
Yoichi Taira, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/853,265

(22) Filed: Sep. 11, 2007

Related U.S. Application Data

(63) Continuation of application No. 11/551,893, filed on Oct. 23, 2006.

(51) Int. Cl.
*G02B 6/10* (2006.01)
(52) U.S. Cl. .......................................... 385/52; 385/129
(58) Field of Classification Search .................. 385/39, 385/50, 52, 59, 65, 78, 83, 129
See application file for complete search history.

(56) References Cited

U.S. PATENT DOCUMENTS 5,218,663 A * 6/1993 Isono et al. .................. 385/129
6,847,764 B2 * 1/2005 Steinberg et al. ............. 385/50
6,905,256 B2 * 6/2005 Morse et al. ................. 385/89
7,177,504 B2 * 2/2007 George et al. ................ 385/49
7,295,743 B2 * 11/2007 Yatsuda et al. ............. 385/129
2005/0031291 A1 * 2/2005 Gao et al. ................... 385/142

* cited by examiner

*Primary Examiner*—Sarah Song
(74) *Attorney, Agent, or Firm*—Vazken Alexanian

(57) ABSTRACT

An apparatus includes an optical wave guide and a ferrule. The optical wave guide has a prespecified horizontal-positioning surface and a prespecified vertical-positioning surface. The ferrule is to precisely couple with the optical wave guide. The ferrule defines a first datum plane mating with the prespecified vertical-positioning surface of the optical wave guide to precisely mechanically vertically position the optical wave guide within the ferrule. The ferrule defines a second datum plane mating with the prespecified horizontal-positioning surface of the optical wave guide to precisely mechanically horizontally position the optical wave guide within the ferrule.

15 Claims, 4 Drawing Sheets

FERRULE FOR OPTICAL WAVE GUIDE

RELATED APPLICATIONS

The present patent application is a continuation of the previously filed and co-pending patent application entitled "Ferrule for optical wave guide," filed on Oct. 23, 2006, and assigned application Ser. No. 11/551,893.

FIELD OF THE INVENTION

The present invention relates generally to connecting optical wave guides of different components to one another, and more specifically to a ferrule for an optical wave guide to connect the optical wave guides of different components together.

BACKGROUND OF THE INVENTION

Traditionally, data communications among different components of computing devices and of computing systems have occurred via electrical wiring, such as copper wiring on printed circuit boards. However, with the increasing speed of various computing components, such as processors and memory, electrical wiring as a connection mechanism has become a bottleneck to transferring data among different components. Therefore, manufacturers have been looking to alternatives other than electrical wiring to connect different components together for data communication purposes.

One alternative is to communicate data among different components of computing devices and of computing systems using light. Such optical data transfer is typically significantly faster than electrical data transfer using electrical wiring, and further does not have the limits that electrical data transfer does. Optical wave guides in particular have become a seriously considered candidate for optically transferring data among different components.

To optically connect different printed circuit boards together, however, a connector is typically required. While light has excellent propagation characteristics in general, a large amount of loss of the light may occur at the connection point if a precise connection between the optical wave guides of two circuit boards is not achieved. A connector for optically connecting the optical wave guides of two such components to one another should also be able to be mechanically attached and detached as needed. Mechanical attachment of a connector to the optical wave guides of the components should thus provide for precise optical connection between the components.

For these and other reasons, therefore, there is a need for the present invention.

SUMMARY OF THE INVENTION

The invention relates generally to a ferrule for an optical wave guide. An apparatus of an embodiment of the invention includes an optical wave guide and a ferrule. The optical wave guide has a prespecified horizontal-positioning surface and a prespecified vertical-positioning surface. The ferrule is to precisely couple with the optical wave guide. The ferrule defines a first datum plane mating with the prespecified vertical-positioning surface of the optical wave guide to precisely mechanically vertically position the optical wave guide within the ferrule. The ferrule defines a second datum plane mating with the prespecified horizontal-positioning surface of the optical wave guide to precisely mechanically horizontally position the optical wave guide within the ferrule.

For instance, in one embodiment, the ferrule may include a bottom portion defining a center trench that has a lower horizontal surface defining the first datum plane. The optical wave guide may include a bottom substrate having a lower horizontal surface defining the prespecified vertical-positioning surface of the optical wave guide and mating with the lower horizontal surface of the center trench of the ferrule. The center trench of the ferrule may have a lug extending from the lower horizontal surface thereof that defines the second datum plane. The bottom substrate of the optical wave guide may further have a notch within its lower horizontal surface defining the prespecified horizontal-positioning surface of the optical wave guide and that corresponds to and mates with the lug extending from the center trench of the ferrule.

In another embodiment, the ferrule may include a bottom portion defining a center trench having a lower horizontal surface and one or more stepped upper horizontal surfaces to either side of the lower horizontal surface. The stepped upper horizontal surfaces define the first datum plane. The optical wave guide may include a cladding layer having one or more lower horizontal surfaces defining the prespecified vertical-positioning surface of the optical wave guide and mating with the stepped upper horizontal surfaces of the center trench of the ferrule. The center trench of the bottom portion of the ferrule may further have one or more vertical side surfaces, at least one of which define the second datum plane. The optical wave guide may further have a core pattern to transmit light, and a dummy core pattern that does not transmit light but that has one or more vertical side surfaces. At least one of the vertical side surfaces of the dummy core pattern define the prespecified horizontal positioning surface of the optical wave guide and mate with corresponding at least one of the vertical side surfaces of the center trench of the ferrule.

At least some embodiments of the invention provide for advantages over the prior art. The ends of two optical wave guides, such as extending from two different components of a computing device or of a computing system, may be precisely optically (and mechanically) mated with one another via the ferrule. The optical wave guides are both inserted into the ferrule, where the various aspects of the optical wave guides and of the ferrule as has been described provides for precise mechanical and optical mating between the optical wave guides and the ferrule and thus between the optical wave guides themselves. A cover, or top portion, of the ferrule snaps onto the bottom portion of the ferrule after insertion of the optical wave guides into the bottom portion, so that the optical wave guides remain connected to one another. Detaching the top portion of the ferrule thus allows for disconnection of the optical wave guides.

Still other aspects, advantages, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
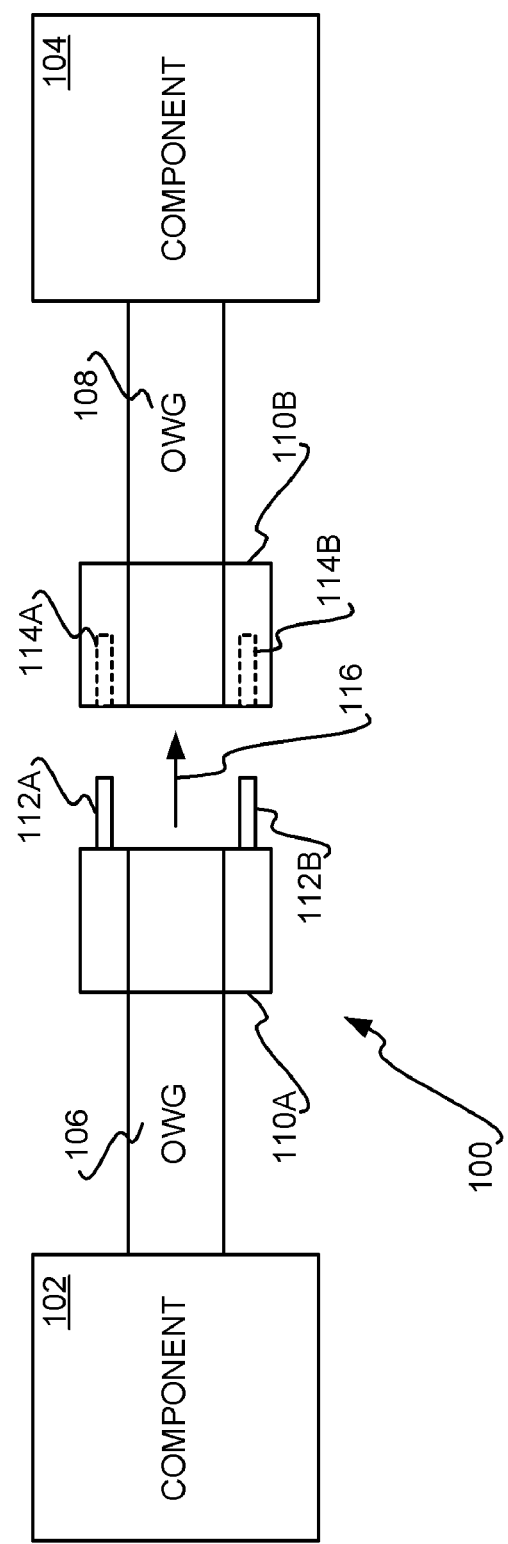
FIG. 1 is a diagram in which the optical wave guides of two components are precisely connected to one another, according to an embodiment of the invention.

FIG. 1 shows a system 100, according to an embodiment of the invention. The system 100 includes two components 102 and 104. The components 102 and 104 may be printed circuit boards, memory, processors, or other types of computing components. The components 102 and 104 may be part of the same computing system, and/or parts of the same computing device. The component 102 includes an optical wave guide 106 for optical data communication therewith, and the component 104 includes an optical wave guide 108 for optical data communication therewith.

The optical wave guides 106 and 108 have ferrules 110A and 110B, respectively, to precisely connect the optical wave guides 106 and 108 precisely together, optically and/or mechanically. An apparatus of one embodiment of the invention can be considered as including one of the ferrules 110A and 10B and a corresponding one of the optical wave guides 106 and 108. The ferrule 110A is a male ferrule having pins 112A and 112B, collectively referred to as the pins 112, whereas the ferrule 110B is a female ferrule having holes 114A and 114B, collectively referred to as the holes 114.

To precisely connect the optical wave guides 106 and 108 together, the pins 112 of the ferrule 110A are aligned with and securely inserted into the holes 114 of the ferrule 110B, as indicated by the arrow 116. In one embodiment, a cover may then be latched onto and over both the ferrules 110A and 110B to secure them in place, which is not particularly depicted in FIG. 1. In another embodiment, such a cover may not be employed. Thus, the ferrules 110A and 110B precisely align the optical wave guides 106 and 108 together to ensure that satisfactory optical coupling occurs between the optical wave guides 106 and 108.

Other embodiments of the invention can vary from the basic depiction of FIG. 1. For instance, one or both of the ferrules 110A and 10B may be permanently mounted to one or both of the components 102 and 104. In general, in at least some embodiments, it can be said that the ferrules 110A and 110B are precisely mechanically connected to both the optical wave guides 106 and 108, so that the optical wave guides 106 and 108 are precisely optically coupled to one another.

Figure 2:
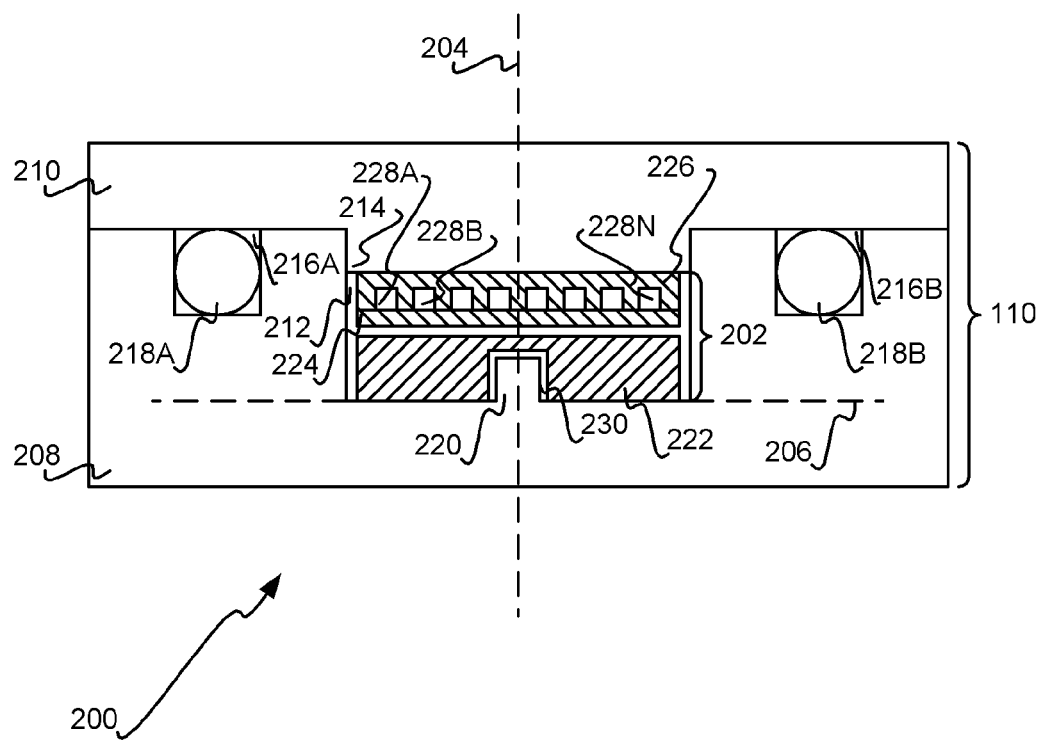
FIG. 2 is a cross-sectional diagram of a ferrule and an optical wave guide, according to an embodiment of the invention.

FIG. 2 shows a cross section of an apparatus 200 including the ferrule 110 and an optical wave guide 202, according to an embodiment of the invention. The optical wave guide 202 may, for instance, be the optical wave guide 106 or 108 of FIG. 1, whereas the ferrule 110 may, for instance, be the ferrule 110A or 110B of FIG. 1. There are two datum planes 204 and 206 defined by the ferrule 110 within FIG. 2. The datum plane 204 provides for precise mechanical positioning of the optical wave guide 202 within the ferrule 110 horizontally, whereas the datum plane 206 provides for precise mechanical positioning of the optical wave guide 202 within the ferrule 110 vertically, as will be described in more detail.

The ferrule 110 includes a bottom portion 208 and a top portion 210. The bottom portion 208 includes a center trench 212 that is substantially located within the center of the ferrule 110, from left to right. The lower horizontal surface of the center trench 212 defines the datum plane 206. A lug 220 extends from the lower horizontal surface of the center trench 212 of the ferrule 110. One of the side surfaces, such as the left side surface in the example of FIG. 2, of the lug 220 defines the datum plane 204.

The bottom portion 208 also is depicted in FIG. 2 as including two side trenches 216A and 216B, collectively referred to as the side trenches 216, to either side of the center trench 212. The side trenches 216 are shallower than the center trench 212, such that the latter is vertically deeper than the former. The side trenches 216 are receptive to corresponding positioning pins 218A and 218B, collectively referred to as the pins 218. The pins 218 may be pins employed to properly position the bottom portion 208 while the center trench 212 and the lug 220 are being fabricated therein, such as in an injection-molding process that employs an injection-molding tool having such pins 218.

In one embodiment, the pins 218 may be the pins 112 of the ferrule 110A of FIG. 1, and the trenches 216 may be the holes 114 of the ferrule 10B of FIG. 1. Therefore, where the ferrule 110 is the ferrule 110A, it includes the pins 218, whereas where the ferrule 110 is the ferrule 110B, it does not include the pins 218. The ferrule 110 of FIG. 2 can therefore be considered a composite ferrule, covering both the case of the ferrule 110A and the case of the ferrule 110B.

Injection molding is particular allows the ferrule 110 to have precise tolerances within a few micrometers. The distance from the centers of the pins 218 to the datum plane 204 is particularly important to be precisely controlled, since the datum plane 204 provides for precise horizontal positioning of the optical wave guide 202 within the ferrule 110. Likewise, the distance from the centers of the pins 218 to the datum plane 206 is particularly important to be precisely controlled, since the datum plane 206 provides for precise vertical positioning of the optical wave guide 202 within the ferrule 110.

The top portion 210 of the ferrule 110 has a bottom surface from which a bottom element 214 extends vertically downward. The bottom element 214 is sized width-wise to correspond to the width of the center trench 212 of the bottom portion 208. Thus, the bottom element 214 of the top portion 210 fits securely within the center trench 212 of the bottom portion 208 of the ferrule 110.

The optical wave guide 202 includes a bottom substrate 222, a bottom cladding layer 224, an optical wave guide core pattern made up of pattern portions 228A, 228B, . . . , 228N, collectively referred to as the pattern portions 228, and an upper cladding layer 226. The substrate 222 has a lower horizontal surface that defines a prespecified vertical-positioning surface of the optical wave guide 202 in the embodiment of FIG. 2. This prespecified vertical-positioning surface mates with or to the datum plane 206 for precise mechanical positioning of the optical wave guide 202 within the ferrule 110, vertically. That is, the lower horizontal surface of the substrate 222 mates with the lower horizontal surface of the center trench 212 of the ferrule 110 for precise mechanical vertical positioning of the optical wave guide 202 within the ferrule 110. Where the former comes into contact with (i.e., mates with) the latter, it can be said and known that the optical wave guide 202 is properly and precisely mechanically vertically positioned within the ferrule 110.

The lower horizontal surface of the substrate 222 of the optical wave guide 202 also has a notch 230 therein that defines a prespecified horizontal-positioning surface of the optical wave guide 202 in the embodiment of FIG. 2. More particularly, one of the side surfaces, such as the left side surface in the example of FIG. 2, of the notch 230 defines the prespecified horizontal-positioning surface of the optical wave guide 202 in the embodiment of FIG. 2. This prespecified horizontal-positioning surface mates with or to the datum plane 204 for precise mechanical positioning of the optical wave guide 202 within the ferrule 110, horizontally. That is, the left side surface of the notch 230 mates with the left side surface of the lug 220 extending from the lower horizontal surface of the center trench 212 of the ferrule 110 for precise mechanical horizontal positioning of the optical wave guide 202 within the ferrule 110. Where the former comes into contact with (i.e., mates with) the latter, it can be said and known that the optical wave guide 202 is properly and precisely mechanically horizontally positioned within the ferrule 110.

The bottom cladding layer 224 is fabricated on the bottom substrate 222 of the optical wave guide 202. The pattern portions 228 of the core pattern of the optical wave guide 202 are fabricated on the bottom substrate 222, but are of a different material than the bottom substrate 222. The core pattern (i.e., the pattern portions 228) enable light to be transmitted through the optical wave guide 202, such as light which may carry data transmitted to or from a component of a computing system or of a computing device. The upper cladding layer 226 is then fabricated on the core pattern (and on the bottom cladding layer 224), such as from the same material as of the bottom cladding layer 224.

In operation, the top portion 210 of the ferrule 110 is removed, and a pair of optical wave guides, such as including the optical wave guide 202, are inserted into the bottom portion 208 of the ferrule 110. The optical wave guides are mechanically precisely positioned within the ferrule 110 both vertically and horizontally as has been described, to ensure that the optical wave guides are effectively optically coupled to one another. Thereafter, the top portion 210 is snapped back into the bottom portion 208, where the top portion 210 makes forcible contact with the upper cladding layer 226 of the optical wave guides to keep the optical wave guides in place as have been precisely mechanically aligned vertically and horizontally within the ferrule 110. That is, the top portion 210 maintains pressure on the optical wave guides to keep them in place after they have been inserted into the bottom portion 208 in a precisely aligned manner.

Figure 3:
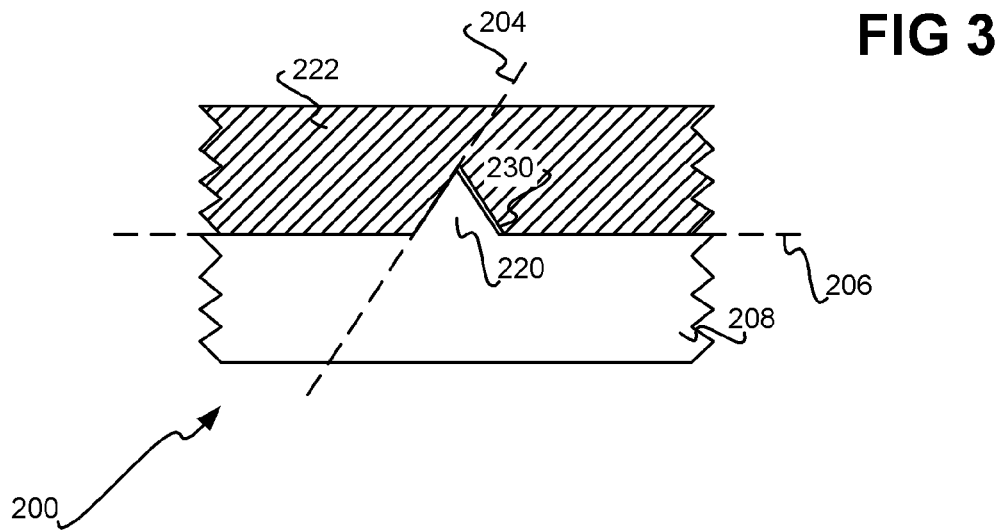
FIG. 3 is a partial cross-sectional diagram of the ferrule and the optical wave guide of FIG. 2, according to another embodiment of the invention.

The lug 220 and the notch 230 have been depicted in FIG. 2 as being at least substantially rectangular in shape. By comparison, FIG. 3 shows a portion of the apparatus 200 in which the lug 220 and the notch 230 are V-shaped, according to an embodiment of the invention. As before, the lug 220 extends from the lower horizontal surface of the center trench 212 within the bottom portion 208 of the ferrule 110, where this lower horizontal surface defines the datum plane 206. In the example of FIG. 3, the left side surface of the lug 220 defines the datum plane 204.

The notch 230 within the lower horizontal surface of the substrate 222 corresponds to and mates with the lug 220. This lower horizontal surface defines the prespecified vertical-positioning surface of the optical wave guide 202 that mates with or to the datum plane 206. In the example of FIG. 3, the left side surface of the notch 230 defines the prespecified horizontal-positioning surface of the optical wave guide 202, which matches with or to the datum plane 204. The V-shaped notch 230 and the V-shaped lug 220 of FIG. 3 can provide for more accurate and precise positioning of the optical wave guide 202 within the ferrule 110 as compared to the rectangularly shaped notch 230 and the rectangularly shaped lug 220 of FIG. 2.

Figure 4:
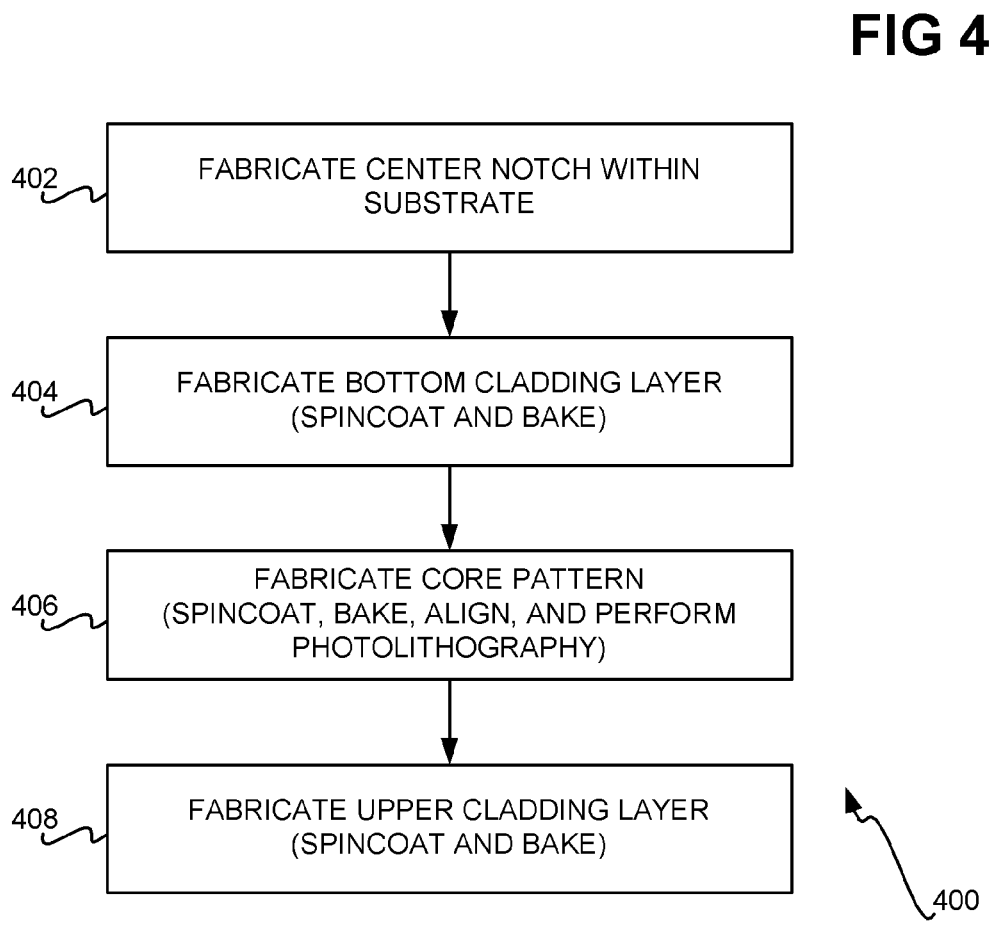
FIG. 4 is a flowchart of a method for fabricating the optical wave guide of FIG. 2, according to an embodiment of the invention.

FIG. 4 shows a method 400 for fabricating the optical wave guide 202 of FIG. 2, according to an embodiment of the invention. The center notch 230 is fabricated within the lower horizontal surface of the substrate 222 of the optical wave guide 202 (402). For instance, the substrate 222 may be turned upside down, so that the lower horizontal surface thereof faces upward, and the notch 230 diced within the substrate 222 using a dicing tool. In one embodiment, the width and depth of the notch 230 may be forty and seventy-five micrometers, respectively. In the particular embodiment of FIG. 2, at least one side of the notch 230 is perpendicular to the surface of the substrate 202, for pushing against the lug 220 for proper and precise positioning of the optical wave guide 202 within the ferrule 110, as has been described. The substrate 222 may be a polyethylene terephthalate (PET) film, or another type of film, and may be 100 micrometers in height.

Next, the substrate 222 is turned over so that the center notch 230 faces downwards, and the bottom cladding layer 224 is fabricated on the substrate 222 (404). The substrate 222 may be affixed to another entity during the fabrication process of the entire optical wave guide 202, which is referred to herein as the base substrate, and which is different than the substrate 222. Acrylic or another material may be spincoated as the bottom cladding layer 224 onto the substrate 222 using a spincoating tool. In one embodiment, the thickness of the bottom cladding layer 224 is twenty micrometers. After spincoating, the substrate 222 with the bottom cladding layer 224 thereon is baked on a hot plate, such as at 100 degrees Celsius (° C.) for twenty minutes, and dried. Thereafter, the bottom cladding layer 224 may be exposed to ultraviolet (UV) or other radiation using an appropriate tool, as can be appreciated by those of ordinary skill within the art, such as for five minutes, and then baked again, such as at 150 degrees ° C. for thirty minutes.

The core pattern—that is, the pattern portions 228 thereof—is then fabricated on the bottom cladding layer 224 (406). The material of the core pattern, which is different than the material of the bottom cladding layer 224 in that it transmits light, whereas the material of the bottom cladding layer 224 does not, may be spincoated onto the bottom cladding layer 224 using a spincoating tool, so as to achieve a thickness, for example, of fifty micrometers. The substrate 222 with the bottom cladding layer 224 and the resulting added core pattern material may then be baked on a hot plate at 100° C. for twenty minutes and dried. Thereafter, the optical wave guide 202 as assembled thus far can be placed within an aligning tool to expose the core pattern material to UV or other radiation through a photomask containing the core pattern corresponding to the portions 228 to be fabricated.

The photomask is aligned specifically relative to the feature of the substrate 22 corresponding to the datum line 204, such as the left side surface of the notch 230, as has been described. This ensures that the mask, and thus the core pattern made up of the pattern portions 228, is precisely aligned or positioned relative to the notch 230, and therefore ultimately to the datum line 204. Exposure may be achieved for a period of time such as ten minutes. Thereafter, the core pattern material is developed to remove either those parts thereof that were exposed to radiation (i.e., positive photolithography), or those that were not (i.e., negative photolithography). The result is that only the portions 228 of the core pattern material remain. The process described heretofore in this paragraph is conventional photolithographical fabrication. After developing, the pattern portions 228, as well as the exposed portions of the bottom cladding layer 224, may be exposed for five minutes or another period of time to UV or other radiation using an appropriate tool, as can be appreciated by those of ordinary skill within the art, and then baked again, such as for 150° C. for sixty minutes.

Finally, the upper cladding layer 226 of the optical wave guide 202 is fabricated on the core pattern (and on the exposed portions of the bottom cladding layer 224) (408). For instance, a spincoating tool may be used to spincoat the same material as that of which the bottom cladding layer 224 is made, such that the upper cladding layer 226 has a thickness of twenty micrometers, and is thus made from the same acrylic or other material as the bottom cladding layer 224. The resulting optical wave guide 202 may then be baked on a hot plate at 100° C. for twenty minutes, and exposed to UV or other radiation one last time, using an appropriate tool, for five minutes. Thereafter, the optical wave guide 202 is baked one last time at 150° C. for thirty minutes. The optical wave guide 202 is removed from the base substrate, and can then be cut using the same dicing tool as was used to form the notch 230 at the beginning of the method 400 of FIG. 4.

Figure 5:
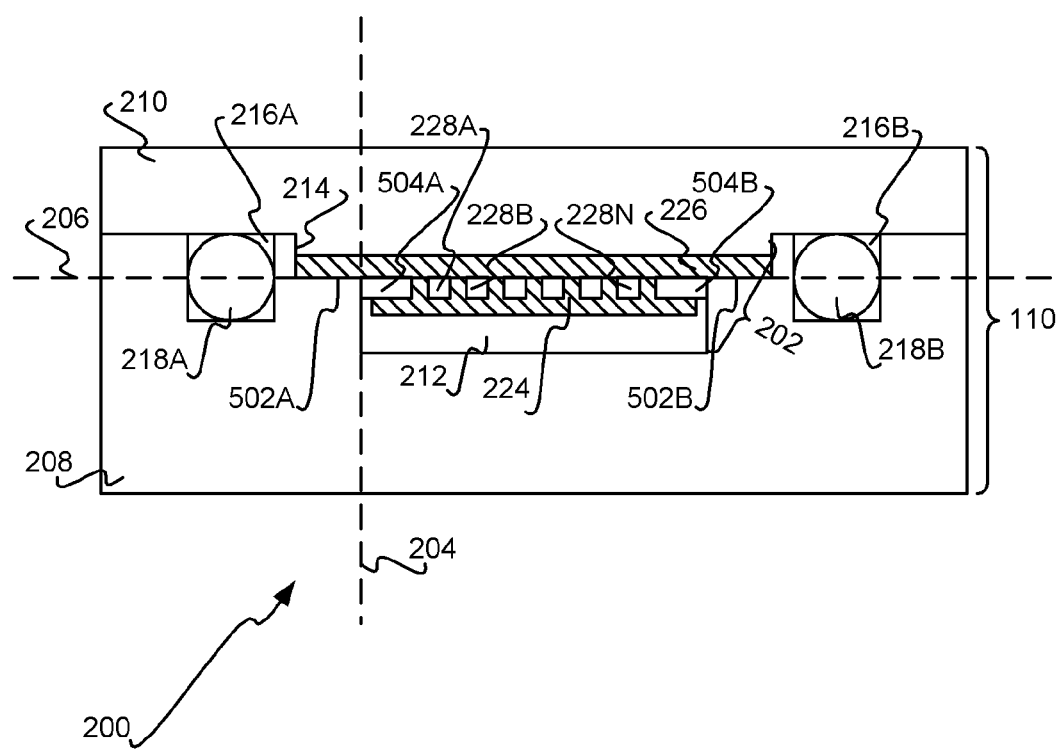
FIG. 5 is a cross-sectional diagram of an apparatus including the ferrule of FIG. 2 and the optical waveguide of FIG. 2, according to an embodiment of the invention.

FIG. 5 shows a cross section of the apparatus 200 including the ferrule 110 of FIG. 2 and the optical wave guide 202 of FIG. 2, according to an alternate embodiment of the invention. There are again two datum planes 204 and 206 defined by the ferrule 110 within FIG. 5. The datum plane 204 provides for precise mechanical positioning of the optical wave guide 202 within the ferrule 110 horizontally, whereas the datum plane 206 provides for precise mechanical positioning of the optical wave guide 202 within the ferrule 110 vertically. Operation of the apparatus 200 of the embodiment of FIG. 5 is the same as that as in the embodiment of FIG. 2, except as explained differently below.

The ferrule 110, as before, includes the bottom portion 208 and the top portion 210. The bottom portion 208 includes the center trench 212 and the side trenches 216 (receptive to the pins 218), as in FIG. 2. However, the center trench 212, besides including the lower horizontal surface, also includes stepped upper horizontal surfaces 502A and 502B, collectively referred to as the stepped upper horizontal surfaces 502, in the embodiment of FIG. 5. The surfaces 502 are upper surfaces of the center trench 212 in that they are shallower, and not as deep, as the lower horizontal surface. The surfaces 502 are stepped in that the trench steps downward from the surfaces 502 to the lower horizontal surface.

The stepped upper horizontal surfaces 502 of the center trench 212 of the bottom portion 208 of the ferrule 110 define the datum plane 206. Furthermore, the center trench 212 of the bottom portion 208 includes two vertical side surfaces. One of these vertical side surfaces defines the datum plane 204. In the example of FIG. 5, the left vertical side surface defines the datum plane 204.

The top portion 210 of the ferrule 110 has a bottom surface from which a bottom element 214 extends vertically downward, as in FIG. 2. The bottom element 214 is sized width-wise to correspond to the width of the center trench 212 of the bottom portion 208. Thus, the bottom element 214 of the top portion 210 fits securely within the center trench 212 of the bottom portion 208 of the ferrule 110.

The optical wave guide 202 includes the cladding layer 224, the optical wave guide core pattern made up of the pattern portions 228, the cladding layer 226, and a so-called dummy optical wave guide core pattern made up of pattern portions 504A and 504B, collectively referred to as the dummy pattern portions 504. It is noted that in one embodiment, fabrication of the optical wave guide 202 of FIG. 5 may be achieved similarly to that of FIG. 2 as described in the method 400 of FIG. 4. The dummy core pattern may be fabricated at the same time as the actual core pattern, but is referred to as a dummy pattern in that it is not actually used for light transmission purposes (although it may be capable of doing so). Also, during fabrication, the cladding layer 226 may be fabricated first, then the pattern portions 228 and 504 are fabricated, and finally the cladding layer 224 is fabricated. Thus, the optical wave guide 202 is flipped so that it is inserted cladding layer 224 first into the ferrule 110, as depicted in FIG. 5.

The cladding layer 226 of the optical wave guide 202 is fabricated so that it is sufficiently wide to contact the stepped upper horizontal surfaces 502 of the center trench 212 of the bottom portion 208 of the ferrule 110. Thus, the cladding layer 226 has two lower horizontal surfaces—a left lower surface contacting the surface 502A and a right lower surface contacting the surface 502B—that define a prespecified vertical-positioning surface of the optical wave guide 202 in the embodiment of FIG. 5. This prespecified vertical-positioning surface mates with or to the datum plane 206 for precise mechanical positioning of the optical wave guide 202 within the ferrule 110, vertically. That is, the lower horizontal surfaces of the cladding layer 226 mate with the stepped upper horizontal surfaces 502 of the center trench 212 of the ferrule 110 for precise mechanical vertical positioning of the optical wave guide 202 within the ferrule 110. Where the former comes into contact with (i.e., mates with) the latter, it can be said and known that the optical wave guide 202 is properly and precisely mechanically vertically positioned within the ferrule 110.

The dummy pattern portions 504 of the dummy core pattern of the optical wave guide 202 have two vertical side surfaces, a left vertical side surface at the left-most surface of the portion 504A, and a right vertical side surface at the right-most surface of the portion 504B. One of these vertical side surfaces defines a prespecified horizontal-positioning surface of the optical wave guide 202 in the embodiment of FIG. 5. In the example of FIG. 5, the left vertical side surface of the dummy pattern portions 504 defines the prespecified horizontal-positioning surface of the optical wave guide. This prespecified horizontal-positioning surface mates with or to the datum plane 204 for precise mechanical positioning of the optical wave guide 202 within the ferrule 110, horizontally. That is, the left side surface of the dummy pattern portion 504A mates with the left side surface of center trench 212 of the ferrule 110 for precise mechanical horizontal positioning of the optical wave guide 202 within the ferrule 110. Where the former comes into contact with (i.e., mates with) the latter, it can be said and known that the optical wave guide 202 is properly and precisely mechanically horizontally positioned within the ferrule 110.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

What is claimed is:

1. An apparatus comprising:
    an optical wave guide having a prespecified horizontal-positioning surface and a prespecified vertical-positioning surface; and,
    a ferrule to precisely couple with the optical wave guide,
        wherein the ferrule defines a first datum plane mating with the prespecified vertical-positioning surface of the optical wave guide to precisely mechanically vertically position the optical wave guide within the ferrule,
        wherein the ferrule defines a second datum plane mating with the prespecified horizontal-positioning surface of the optical wave guide to precisely mechanically horizontally position the optical wave guide within the ferrule, and
        wherein the ferrule has a top portion and a bottom portion, the top portion locking into the bottom portion, the optical wave guide disposed between the top portion and the bottom portion of the ferrule, the top portion having a width at least substantially equal to a width of the bottom portion, the top portion and the bottom portion of the ferrule being separate from one another and from the optical wave guide.

2. The apparatus of claim 1, wherein the ferrule is precisely mechanically attachably and detachably couple with the optical wave guide.

3. The apparatus of claim 1, wherein the bottom portion defines a center trench, the center trench having a lower horizontal surface defining the first datum plane of the ferrule.

4. The apparatus of claim 3, wherein the optical wave guide comprises a bottom substrate having a lower horizontal surface defining the prespecified vertical-positioning surface of the optical wave guide and mating with the lower horizontal surface of the center trench of the ferrule.

5. The apparatus of claim 1, wherein the bottom portion defines a center trench having a lug extending from a lower horizontal surface of the center trench, the lug defining the second datum plane of the ferrule.

6. The apparatus of claim 5, wherein the optical wave guide comprises a bottom substrate having a lower horizontal surface within which a notch defines the prespecified horizontal-positioning surface of the optical wave guide and corresponds to and mates with the lug extending from the center trench of the ferrule.

7. The apparatus of claim 5, wherein the lug is substantially cross-sectionally rectangularly shaped.

8. The apparatus of claim 5, wherein the lug is substantially cross-sectionally V-shaped.

9. The apparatus of claim 1, wherein the bottom portion defines a center trench having a lower horizontal surface and one or more stepped upper horizontal surfaces to either side of the lower horizontal surface, the stepped upper horizontal surfaces defining the first datum plane of the ferrule.

10. The apparatus of claim 9, wherein the optical wave guide comprises a cladding layer having one or more lower horizontal surfaces defining the prespecified vertical-positioning surface of the optical wave guide and mating with the stepped upper horizontal surfaces of the center trench of the ferrule.

11. The apparatus of claim 1, wherein the bottom portion defines a center trench having a first vertical side surface and a second vertical side surface, at least one of the vertical side surfaces of the center trench defining the second datum plane of the ferrule.

12. The apparatus of claim 11, wherein the optical wave guide comprises a core pattern to transmit light therethrough, and a dummy core pattern that does not transmit light but that has a first vertical side surface and a second vertical side surface, at least one of the vertical side surfaces of the dummy core pattern defining the prespecified horizontal-positioning surface of the optical wave guide and mating with at least one of the vertical side surfaces of the center trench of the ferrule.

13. The apparatus of claim 1, wherein the bottom portion defines a center trench receptive to the optical wave guide and one or more side trenches receptive to corresponding positioning pins, the center trench vertically deeper than the side trenches; and,
    the top portion has a bottom surface from which a bottom element vertically extends and that corresponds to the center trench of the bottom portion such that the optical wave guide is positioned within the ferrule between the bottom and top portions.

14. The apparatus of claim 1, wherein the optical wave guide comprises:
    a bottom cladding layer;
    a core pattern on the bottom cladding layer and to transmit light through the optical wave guide; and,
    an upper cladding layer on the core pattern of the bottom cladding layer.

15. An apparatus comprising:
    an optical wave guide having a prespecified horizontal-positioning surface and a prespecified vertical-positioning surface; and,
    means for precisely coupling with the optical wave guide,
        wherein the means defines a first datum plane mating with the prespecified vertical-positioning surface of the optical wave guide to precisely mechanically vertically position the optical wave guide within the means,
        wherein the means defines a second datum plane mating with the prespecified horizontal-positioning surface of the optical wave guide to precisely mechanically horizontally position the optical wave guide within the means, and
        wherein the means has a top portion and a bottom portion, the top portion locking into the bottom portion, the optical wave guide disposed between the top portion and the bottom portion, the top portion having a width at least substantially equal to a width of the bottom portion, the top portion and the bottom portion being separate from one another and from the optical wave guide.

* * * * *